(12) United States Patent
Komatsu

(10) Patent No.: US 12,123,386 B2
(45) Date of Patent: Oct. 22, 2024

(54) VEHICLE

(71) Applicant: TOYOTA JIDOSHA KABUSHIKI KAISHA, Toyota (JP)

(72) Inventor: Takehiro Komatsu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/458,186

(22) Filed: Aug. 30, 2023

(65) Prior Publication Data
US 2024/0141858 A1 May 2, 2024

(30) Foreign Application Priority Data
Nov. 2, 2022 (JP) .................. 2022-176647

(51) Int. Cl.
*F02P 5/15* (2006.01)
*F01N 3/021* (2006.01)
*F02D 41/02* (2006.01)

(52) U.S. Cl.
CPC ............ *F02P 5/1506* (2013.01); *F01N 3/021* (2013.01); *F02D 41/0235* (2013.01)

(58) Field of Classification Search
CPC ..... F02P 5/1506; F01N 3/021; F02D 41/0235
See application file for complete search history.

(56) References Cited

U.S. PATENT DOCUMENTS

| | | | |
|---|---|---|---|
| 2015/0059697 A1* | 3/2015 | Iijima | F02D 41/024 123/406.53 |
| 2020/0370483 A1* | 11/2020 | Cohn | F02P 5/1521 |
| 2021/0087989 A1* | 3/2021 | Ohori | F02D 41/064 |

FOREIGN PATENT DOCUMENTS

| | | | | |
|---|---|---|---|---|
| JP | 2007056700 A | * | 3/2007 | |
| JP | 2008133743 A | * | 6/2008 | |
| JP | 2022-036181 A | | 3/2022 | |
| WO | WO-2015145996 A1 | * | 10/2015 | F02D 41/0245 |

\* cited by examiner

*Primary Examiner* — Audrey B. Walter
(74) *Attorney, Agent, or Firm* — SoraIP, Inc.

(57) ABSTRACT

A vehicle comprising: an engine that is a driving power source; a filter that collects an exhaust particulate matter from the engine; and a control device, wherein the control device includes: a temperature raising control unit that raises the temperature of the filter by retard processing of the ignition timing of the engine; and a retard amount control unit that lowers the retard amount of the ignition timing at the time of cold start of the engine than the retard amount of the ignition timing at the time of warm start of the engine.

2 Claims, 4 Drawing Sheets

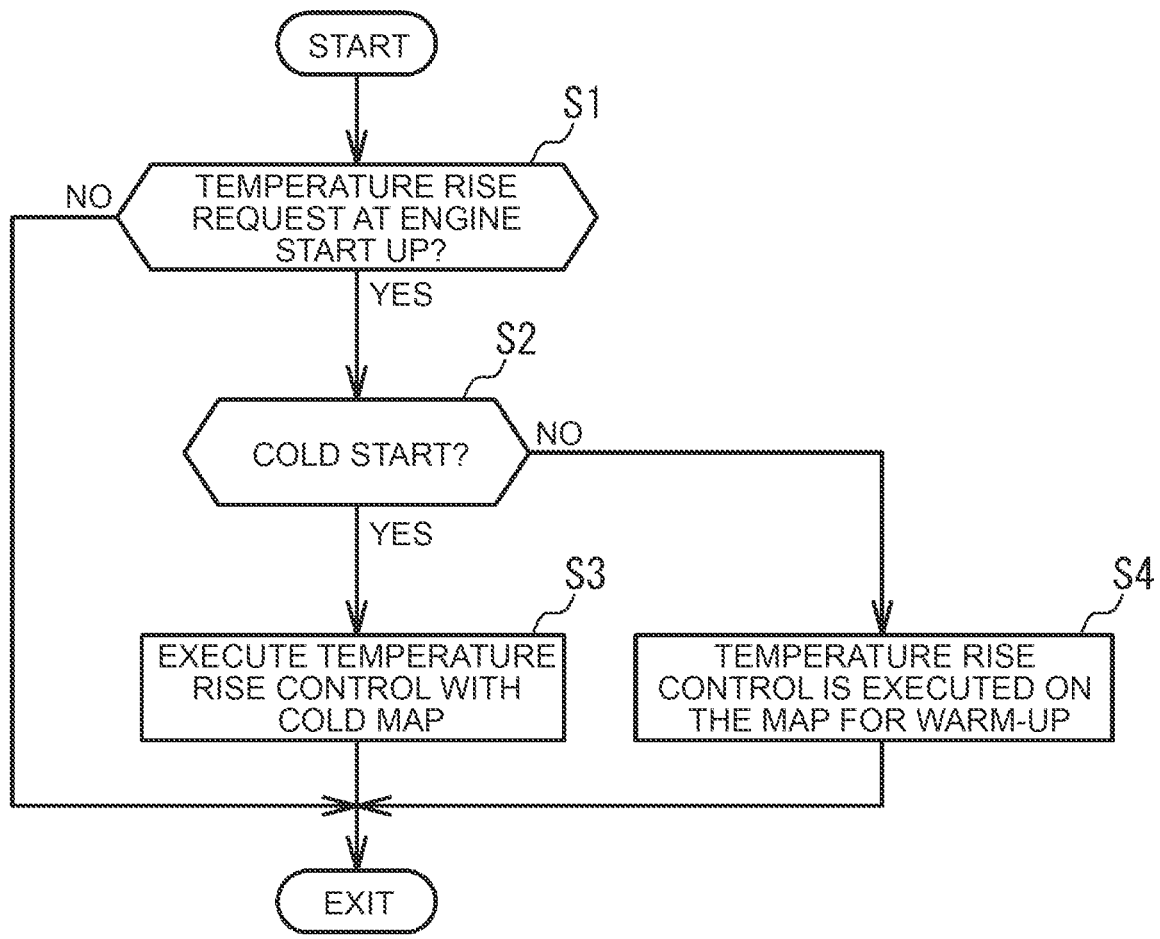

VEHICLE

CROSS-REFERENCE TO RELATED APPLICATION

This application claims priority to Japanese Patent Application No. 2022-176647 filed on Nov. 2, 2022, incorporated herein by reference in its entirety.

BACKGROUND

1. Technical Field

The present disclosure relates to a vehicle.

2. Description of Related Art

Regeneration control of the filter may be required to suppress clogging of a filter. When a temperature of the filter when the regeneration control is requested is low, temperature rise control is executed to increase the temperature of the filter by increasing exhaust heat amount by retard processing of the ignition timing (see, for example, Japanese Unexamined Patent Application Publication No. 2022-036181 A (JP 2022-036181 A)).

SUMMARY

In the case of the cold start of the engine and the case of the warm start, a load on the engine is different, and the exhaust heat amount of the engine is also different. Therefore, when the temperature rise control is executed at the time of starting the engine, there is a possibility that the temperature of the filter after the temperature rise varies.

It is therefore an object of the present disclosure to provide a vehicle in which variations in the temperature of the filter due to the temperature rise control at the time of starting an engine are suppressed.

The above object can be achieved by the following vehicle.

The vehicle includes: an engine that is a driving power source; a filter that collects an exhaust particulate matter from the engine; and a control device.

The control device includes a temperature raising control unit that raises a temperature of the filter by retard processing of an ignition timing of the engine, and a retard amount control unit that lowers a retard amount of an ignition timing at a cold start of the engine than a retard amount of an ignition timing at a warm start of the engine.

The retard amount control unit may decrease the retard amount as a rotational speed of the engine increases, and decrease the retard amount as an in-cylinder air amount of the engine increases.

The vehicle may include: a motor that is a driving power source; and a battery that exchanges electric power with the motor.

According to the present disclosure, it is possible to provide a vehicle in which variations in a temperature of a filter due to temperature rise control at the time of starting the engine are suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart illustrating the temperature rise control at the time of starting the engine;

DETAILED DESCRIPTION OF EMBODIMENTS

Schematic Configuration of Hybrid Electric Vehicle

Figure 1:
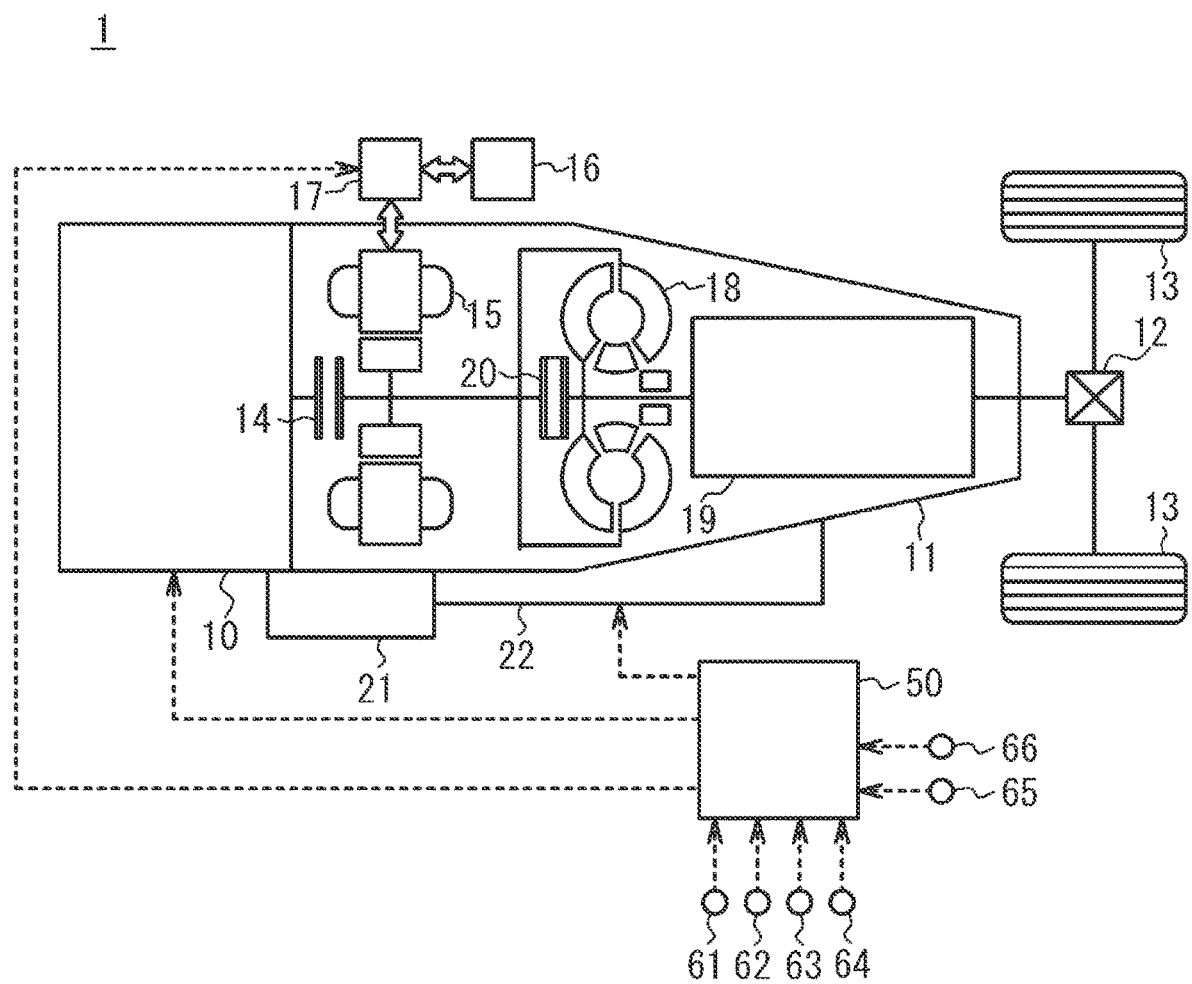
FIG. 1 is a schematic configuration diagram of a hybrid electric vehicle.

FIG. 1 is a schematic configuration diagram of a hybrid electric vehicle 1. Hybrid electric vehicle 1 is equipped with an engine 10 and a motor 15 as a driving power source. The engine 10 is a gasoline engine having a plurality of cylinders. However, the engine 10 may be a diesel engine. A transmission unit 11 is provided on a power transmission path from the engine 10 to the drive wheels 13. The transmission unit 11 and the left and right drive wheels 13 are drivingly connected to each other via a differential 12.

The transmission unit 11 is provided with a K0 clutch 14 and a motor 15. The motor 15 is provided on a power transmission path from the engine 10 to the drive wheels 13. K0 clutch 14 is provided between the engine 10 and the motor 15 in the power transmission path. K0 clutch 14 is engaged by receiving the hydraulic pressure and connects the power transmission between the engine 10 and the motor 15. K0 clutch 14 is released in response to the stoppage of the hydraulic pressure supply and shuts off the power transmission between the engine 10 and the motor 15. In addition, K0 clutch 14 is slipped from the beginning of the torque-transmission until it is fully engaged.

The motor 15 is connected to the battery 16 via an inverter 17. The battery 16 is a rechargeable secondary battery such as a nickel-metal hydride battery or a lithium-ion battery. The motor 15 functions as a motor that generates a driving force of the vehicle in response to power supply from the battery 16. The motor 15 also functions as a generator that generates electric power to charge the battery 16 in response to power transmission from the engine 10 and the drive wheels 13. The electric power exchanged between the motor 15 and the battery 16 is adjusted by the inverter 17.

The transmission unit 11 is provided with a torque converter 18 and an automatic transmission 19. The torque converter 18 is a fluid coupling having a torque amplification function. The automatic transmission 19 is a stepped transmission in which the gear ratio is switched in multiple stages. The torque converter 18 is provided between the motor 15 and the drive wheels 13 on the power transmission path. The automatic transmission 19 is provided between the torque converter 18 and the drive wheels 13 on the power transmission path. The torque converter 18 is provided with a lock-up clutch (hereinafter referred to as a LU clutch) 20 which is engaged with the motor 15 by receiving the supply of the hydraulic pressure and directly connects the motor to the automatic transmission 19.

LU clutch 20 is engaged by receiving the hydraulic pressure and connects the power transmission between the motor 15 and the drive wheels 13. LU clutch 20 is released in response to the stoppage of the hydraulic pressure supplying. LU clutch 20 is also slipped from release to engagement.

The transmission unit 11 is further provided with an oil pump 21 and a hydraulic control mechanism 22. The hydraulic pressure generated by the oil pump 21 is supplied to K0 clutch 14, the torque converter 18, the automatic transmission 19, and LU clutch 20 via the hydraulic control mechanism 22. The hydraulic control mechanism 22 is provided with hydraulic circuits of K0 clutch 14, the torque converter 18, the automatic transmission 19, and LU clutch 20, and various hydraulic control valves for controlling the hydraulic pressures.

Hybrid electric vehicle 1 is provided with an Electronic Control Unit (ECU) 50 as a control device of the vehicle. ECU 50 is an electronic control unit including an arithmetic processing unit that performs various arithmetic processing related to travel control of vehicles, and a memory that stores control programs and data. ECU 50 is an exemplary control device for vehicles, and realizes a temperature raising control unit and a retard amount control unit, which will be described in detail later, functionally.

An ignition switch 61, a crank angle sensor 62, an air flow meter 63, air-fuel ratio sensors 64 and 65, and a water temperature sensor 66 are connected to ECU 50. The ignition switch 61 detects ON/OFF of the ignition. The crank angle sensor 62 detects the rotational speed of the crankshaft of the engine 10. The air flow meter 63 detects an amount of intake air introduced into the engine 10. The air-fuel ratio sensors 64 and 65 detect the air-fuel ratio of the exhaust gas of the engine 10. The water temperature sensor 66 detects the temperature of the coolant for cooling the engine 10.

ECU 50 controls driving of the engine 10 and the motor 15. Specifically, ECU 50 controls the inverter 17 to control the torque of the motor 15 by adjusting the amount of transfer of electric power between the motor 15 and the battery 16. ECU 50 controls driving of K0 clutch 14, LU clutch 20, and the automatic transmission 19 through control of the hydraulic control mechanism 22.

Figure 2:
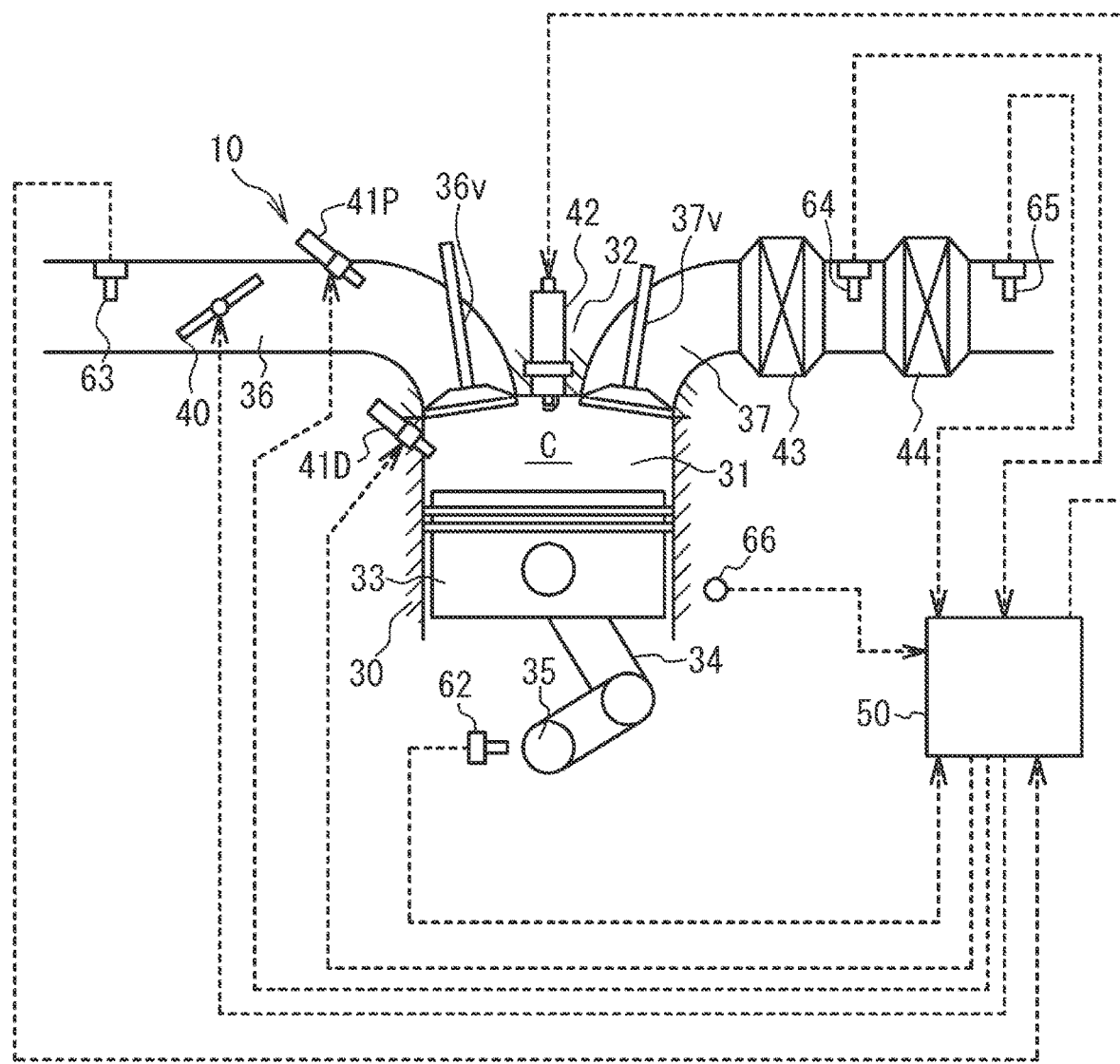
FIG. 2 is a schematic configuration diagram of an engine.

ECU 50 causes hybrid electric vehicle 1 to travel in either the motor running mode or the hybrid running mode. In the motor running mode, ECU 50 releases K0 clutch 14 to rotate the drive wheels 13 with the power of the motor 15. In the hybrid drive mode, ECU 50 engages K0 clutch 14 to rotate the drive wheels 13 with the power of at least one of the engine 10 and the motor 15. For example, when the required driving force for hybrid electric vehicle 1 is equal to or higher than the driving force threshold, the driving force is switched from the motor driving mode to the hybrid driving mode. Further, when the charge amount of the battery 16 becomes equal to or less than the electric power threshold value, the mode is switched from the motor running mode to the hybrid running mode. Schematic configuration of the engine FIG. 2 is a schematic configuration diagram of the engine 10. The engine 10 includes a cylinder block 30, a cylinder head 32, a piston 33, a connecting rod 34, a crankshaft 35, an intake passage 36, an intake valve 36v, an exhaust passage 37, and an exhaust valve 37v.

The cylinder block 30 is provided with a cylindrical bore 31. The piston 33 is reciprocally accommodated in the bore 31. The wall surface of the bore 31, the lower surface of the cylinder head 32, and the top surface of the piston 33 define the combustion chamber C. The volume of the combustion chamber C increases or decreases due to the reciprocation of the piston 33.

The crankshaft 35, which is an output shaft of the engine 10, is connected via a connecting rod 34. The connecting rod 34 and the crankshaft 35 convert the reciprocating motion of the piston 33 into the rotational motion of the crankshaft 35. The engine 10 is provided with the above-described crank angle sensor 62.

The intake passage 36 is connected to the combustion chamber C via an intake valve 36v. The exhaust passage 37 is connected to the combustion chamber C via an exhaust valve 37v. The air flow meter 63 described above is provided in the intake passage 36.

The cylinder block 30 is provided with an in-cylinder injection valve 41D for directly injecting fuel into the combustion chamber C. The intake passage 36 is provided with a port injection valve 41P for injecting fuel toward the intake port. The cylinder head 32 is provided with an ignition plug 42 for igniting the air-fuel mixture of the intake air and fuel introduced into the combustion chamber C. Note that only one of the in-cylinder injection valve 41D and the port-injection valve 41P may be provided.

A three-way catalyst 43 and a Gasoline Particulate Filter (GPF) 44 are provided in the exhaust passage 37. The three-way catalyst 43 contains a catalyst metal, has an oxygen-absorbing ability, and purifies NOx, HC and CO. GPF 44 is a porous ceramic structure, and collects exhaust particulate matter (hereinafter, referred to as Particulate Matter (PM) in exhaust gases. GPF 44 is an exemplary filter. For example, when the engine 10 is a diesel engine, a Diesel Particulate Filter (DPF) is provided instead of GPF 44.

An air-fuel ratio sensor 64 is provided between the three-way catalyst 43 and GPF 44. The air-fuel ratio sensor 64 detects the air-fuel ratio of the exhaust gas discharged from the three-way catalyst 43. An air-fuel ratio sensor 65 is provided downstream of GPF 44. The air-fuel ratio sensor 65 detects the air-fuel ratio of the exhaust gas discharged from GPF 44.

In ECU 50, the driving of the engine 10 is controlled by controlling the opening degree of the throttle valve 40, the fuel-injection quantity of the in-cylinder injection valve 41D and the port-injection valve 41P, the ignition timing of the ignition plug 42, and the like, based on the sensor-detected signal.

ECU 50 estimates GPF 44 deposition amount of PM, and requests regeneration control of GPF 44 when PM deposition amount becomes equal to or greater than a predetermined value. In the method of estimating PM deposition amount, PM deposition amount may be estimated based on, for example, the drive history of the engine 10 from the completion of the previous regeneration control, the differential pressure before and after GPF 44, or the like, or PM deposition amount may be estimated by a known method. In the regeneration control, oxygen for burning the accumulated PM is supplied to GPF 44, for example, by performing fuel-cutting and controlling the air-fuel ratio to the lean air-fuel ratio.

Temperature Rise Control

As described above, when GPF 44 is required to be regenerated and the temperature of GPF 44 is less than the predetermined value, ECU 50 executes temperature raising control for raising the temperature of GPF 44 to the predetermined temperature. The temperature rise control is executed by retard processing of the ignition timing for controlling the ignition timing to a retard side from the basic ignition timing. By the retard processing of the ignition timing, the exhaust-gas heat quantity increases and the temperature of GPF 44 can be increased. Therefore, the regeneration control is executed after the temperature of GPF 44 is raised, so that PM deposited on GPF 44 can be efficiently combusted.

However, the subsequent load on the engine 10 differs depending on the temperature of the engine 10 at the time of starting the engine 10, and the exhaust heat quantity also differs. For example, in the case of cold start, the friction torque of the engine 10 and the drag torque of the torque converter 18 are large. Therefore, the load on the engine 10 is large, and the exhaust heat quantity is also large. On the other hand, in the case of warm start, the above-mentioned friction torque and drag torque are small, and the exhaust heat quantity is also small. Therefore, when the retardation amount of the ignition timing is uniformly controlled and the temperature rise control is executed at the start of the engine 10, there is a possibility that the temperature of GPF 44 after the temperature rise varies. If the temperature of GPF 44 after the temperature increase varies, the temperature of GPF 44 becomes too high, which may affect the durability, or the temperature of GPF 44 may be insufficient and the regeneration efficiency may be lowered. ECU 50 according to the present embodiment executes the temperature rise control at the time of starting the engine 10 as follows.

Control of Temperature Rise at Engine Start

FIG. 3 is a flowchart illustrating the temperature rise control at the time of starting the engine 10. This control is repeatedly executed while the ignition is on. ECU 50 determines whether or not there is a temperature increase demand for GPF 44 at the time of starting the engine 10 (S1). If S1 is No, this control is terminated.

If S1 is Yes, ECU 50 determines (S2) whether it is a cold start. Specifically, when the temperature of the coolant of the engine 10 is less than the predetermined value, it is determined that cold start is performed. If S2 is Yes, ECU 50 refers to the cold map and performs temperature rise control (S3). If S2 is No, ECU 50 refers to the warming map and executes the temperature rise control (S4). S3 and S4 are exemplary processes executed by the temperature raising control unit and the retard amount control unit.

Figure 4A:
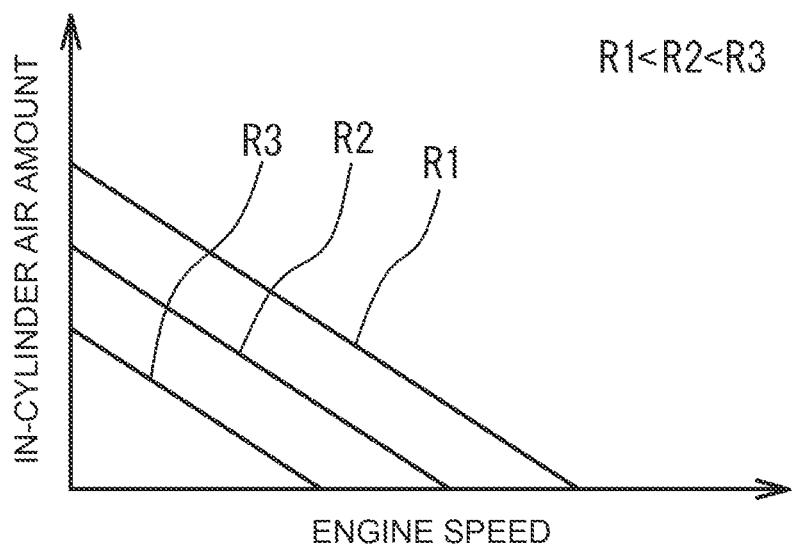
FIG. 4A is a diagram illustrating a cold map defining a retard amount of the ignition timing.
Figure 4B:
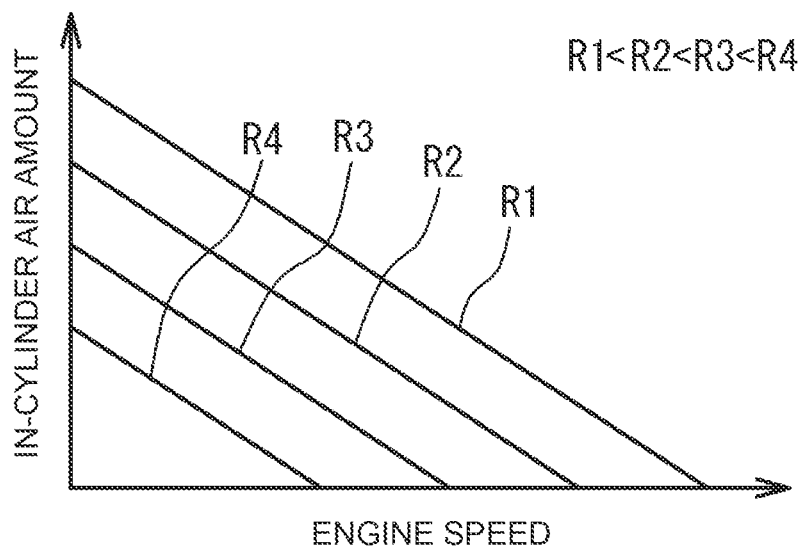
FIG. 4B is a diagram illustrating a warm map defining a retard amount of the ignition timing.

FIGS. 4A and 4B are diagrams illustrating a cold map and a warm map that defines retardation amounts of ignition timings, respectively. The horizontal axis indicates the engine speed. The vertical axis indicates the in-cylinder air amount. The in-cylinder air amount is calculated based on the intake pressure, the valve timing of the intake valve 36v and the exhaust valve 37v, the rotational speed of the engine 10, and the atmospheric pressure. The cold map and the warm map define the retardation amount of the ignition timing according to the engine speed and the in-cylinder air amount. The cold map and the warm map define the retardation amount to a smaller value as the engine speed increases and the in-cylinder air amount increases. Here, the smaller the retard amount is, the smaller the amount of increase in the exhaust heat amount due to the retard processing is.

In the cold map, R3 is defined from the retard amount R1. The retard amount R1 is the smallest value among R3 from the retard amount R1, and the retard amount R3 is the largest value. Further, in the warm map, R4 is defined from the retard amount R1. The retard amount R4 of R4 from the retard amount R1 is the largest. The retard amount R1 is set to, for example, zero. From R1 of the retard amount in the map for cold, R3 corresponds to R4 from the retard amount R2 in the map for warm. That is, when the engine speed and the in-cylinder air amount are the same, the retardation amount defined by the cold map is smaller than the retardation amount defined by the warm map. As described above, in the case of cold start, the exhaust heat quantity is higher than in the case of warm start, because GPF 44 is easily heated. Therefore, the variation in the temperature of GPF 44 after the temperature increase is suppressed in the case of the cold start and the case of the warm start.

In the above example, two maps were used to control the retard amount. However, the retard amount may be controlled by using three or more types of maps based on the temperature of the coolant at the time of starting the engine 10. Further, the retard amount is not limited to being controlled based on the map as described above, and may be controlled based on an arithmetic expression using, for example, the engine speed and the in-cylinder air amount as arguments.

As described above, hybrid electric vehicle 1 includes the motor 15 and the battery 16 in addition to the engine 10. For example, the battery 16 supplies electric power to the motor 15, which is a driving power source, and charges the regenerative electric power of the motor 15. Therefore, the weight of the battery 16 is larger than that of the battery mounted on the engine vehicle. In this way, hybrid electric vehicle 1 is heavier than engine-powered vehicles. As a result, the load on the engine 10 in the hybrid driving mode is larger than that of the engine of the engine vehicle. Therefore, the amount of PM discharged in the hybrid-driving mode may be increased as compared with the engine-driven mode. Therefore, the content of the above embodiment is suitable for hybrid electric vehicle 1.

The content of the above embodiment may also be applied to a control device of an engine vehicle having only an engine as a driving power source. The content of the above embodiment may also be applied to a control device in a hybrid electric vehicle where an engine and a first motor are connected to a drive shaft connected to a drive wheel via a planetary gear and a second motor is connected to the drive shaft.

Examples of the present disclosure have been described in detail above. However, the present disclosure is not limited to such specific embodiments. The present disclosure can be variously modified and modified within the scope of the gist of the present disclosure described in the claims.

The invention claimed is:

1. A vehicle comprising:
    an engine that is a driving power source;
    a filter configured to collect exhaust particulate matter from the engine; and
    a control device, wherein
    the control device includes
        a temperature raising control unit configured to raise a temperature of the filter by retard processing of an ignition timing of the engine, and
        a retard amount control unit configured to lower a retard amount of the ignition timing in a case of a cold start of the engine, compared to in a case of a warm start of the engine, and
    the retard amount control unit is further configured to decrease the retard amount as a rotational speed of the engine increases, and decrease the retard as an in-cylinder air amount of the engine increases.

2. The vehicle according to claim 1, further comprising:
    a motor that is a driving power source; and
    a battery configured to exchange electric power with the motor.

* * * * *